(12) United States Patent
Tseng

(10) Patent No.: US 9,025,916 B2
(45) Date of Patent: May 5, 2015

(54) OPTICAL COMMUNICATION APPARATUS

(71) Applicant: Hon Hai Precision Industry Co., Ltd., New Taipei (TW)

(72) Inventor: Kuo-Fong Tseng, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/102,517

(22) Filed: Dec. 11, 2013

(65) Prior Publication Data

US 2014/0314373 A1    Oct. 23, 2014

(30) Foreign Application Priority Data

Apr. 19, 2013  (TW) .............................. 102114025 U

(51) Int. Cl.
*G02B 6/26* (2006.01)
*G02B 6/42* (2006.01)

(52) U.S. Cl.
CPC ............ *G02B 6/4214* (2013.01); *G02B 6/4273* (2013.01)

(58) Field of Classification Search
CPC .......... G02B 6/4214; G02B 6/32; G02B 6/43; G02B 6/4246; G02B 6/12007
USPC ......................................... 385/14, 15, 31, 39
See application file for complete search history.

(56) References Cited

U.S. PATENT DOCUMENTS 6,504,107 B1 *  1/2003  Kragl ............................ 174/260
2007/0183718 A1 *  8/2007  Bae et al. ........................ 385/47

* cited by examiner

*Primary Examiner* — Jennifer Doan
(74) *Attorney, Agent, or Firm* — Novak Druce Connolly Bove + Quigg LLP

(57) ABSTRACT

An optical communication apparatus includes a PCB, a photoelectric element, a driver chip, and a light waveguide. The PCB defines a groove in a surface thereof. The groove includes a bottom surface and a side surface connected to the bottom surface. The PCB includes a reflecting layer coated on the side surface. The photoelectric element includes an optical portion for emitting/receiving light carrying optical signals. An optical signal emitting/receiving direction of the photoelectric element is substantially perpendicular to the surface of the PCB. The side surface passes through a projection area of the optical portion along a direction substantially perpendicular to the surface of the PCB. An end of the light waveguide is positioned on the bottom surface of the groove and is out of the projection area of the optical portion. The reflecting layer couples optical signals between the photoelectric element and the light waveguide.

10 Claims, 1 Drawing Sheet

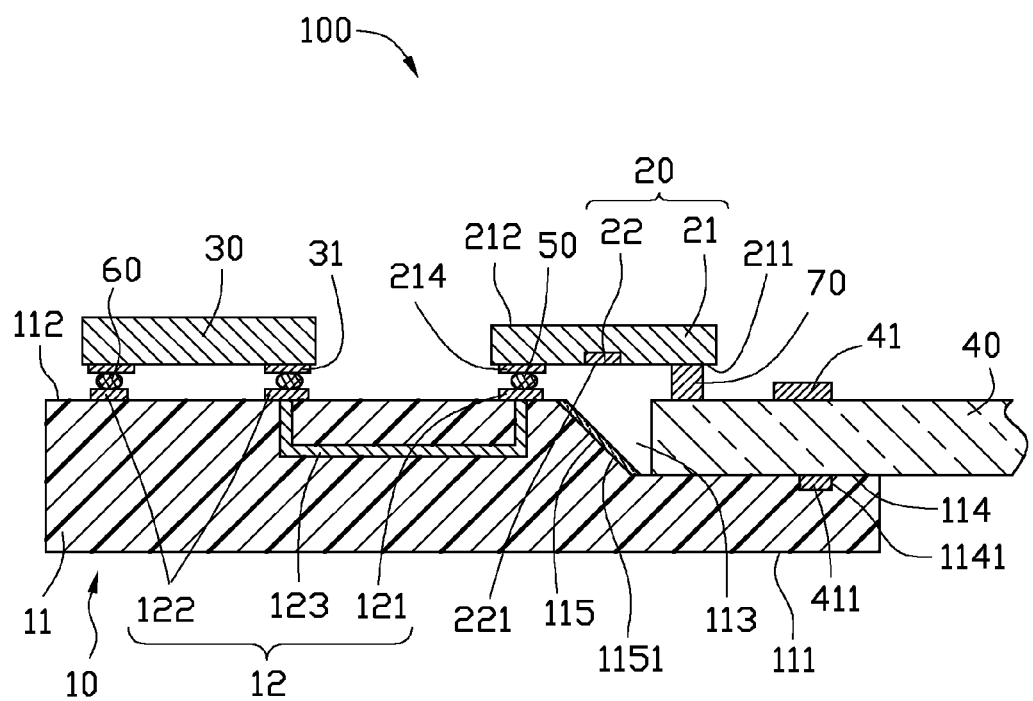

OPTICAL COMMUNICATION APPARATUS

BACKGROUND

1. Technical Field

The present disclosure relates to communication apparatuses, and particularly to an optical communication apparatus.

2. Description of Related Art

An optical communication apparatus generally includes a photoelectric element for emitting/receiving light carrying optical signals, a driver chip for driving the photoelectric element, and a light waveguide for transmitting optical signals. The photoelectric element is positioned on a surface of a printed circuit board (PCB), and an optical signal emitting/receiving direction of the photoelectric element is substantially perpendicular to the surface of the PCB. An end of the light waveguide is positioned on the PCB, and an optical signal transmitting direction of the light waveguide is substantially parallel to the surface of the PCB. Therefore, a deflecting structure is needed to deflect optical signals for a predetermined angle, thereby coupling the optical signals between the photoelectric element and the light waveguide. Generally, the end of the light waveguide is wedged and serves as the deflection structure, in this situation, the end of the light waveguide is positioned right below an optical portion of the photoelectric element. However, when working, the photoelectric element may generate a lot of heat, which may deform the end of the light waveguide, thus an optical transmitting efficiency of the optical communication apparatus may be degraded.

Therefore, what is needed is an optical communication apparatus addressing the limitations described.

BRIEF DESCRIPTION OF THE DRAWING

The components of the drawing are not necessarily drawn to scale, the emphasis instead being placed upon clearly illustrating the principles of the embodiments of the present disclosure.

The FIGURE is a schematic view of an optical communication apparatus, according to an exemplary embodiment of the present disclosure.

DETAILED DESCRIPTION

The FIGURE shows an optical communication apparatus 100, according to an exemplary embodiment of the present disclosure. The optical communication apparatus 100 includes a PCB 10, a photoelectric element 20, a driver chip 30, and a light waveguide 40.

The PCB 10 includes a substrate 11 and a circuit unit 12 formed on the substrate 11. The substrate 11 includes a first surface 111 and an opposite second surface 112. In this embodiment, the substrate 11 is made from silicon (Si). The substrate 11 defines a groove 113 in the second surface 112. The groove 113 passes through an end surface of the substrate 11. A bottom surface 114 of the groove 113 is substantially parallel to the first surface 111. A predetermined obtuse angle is formed between a side surface 115 of the groove 113 and the second surface 112, in this embodiment, the obtuse angle is about 135 degrees. The substrate 11 defines an engaging groove 1141 in the bottom surface 114. The substrate 11 further includes a reflecting layer 1151 coated on the side surface 115 of the groove 113. The reflecting layer 1151 is made from a material(s) with high heat conductivity and high reflectivity, in this embodiment, the reflecting layer 1151 is made from an alloy of nickel and gold. The reflecting layer 1151 is formed on the side surface 115 by a chemical vapor deposition (CVD) process.

The circuit unit 12 electrically connects the photoelectric element 20 and the driver chip 30. The circuit unit 12 includes a first contacting portion 121 corresponding to the photoelectric element 20, two second contacting portions 122 corresponding to the driver chip 30, and a connecting portion 123. The first contacting portion 121 and the second contacting portions 122 are positioned on the second surface 112, and the first contacting portion 121 is adjacent to the groove 113. The connecting portion 123 is embedded in the substrate 11, and two ends of the connecting portion 123 are respectively connected to the first contacting portion 121 and one of the second contacting portions 122.

The photoelectric element 20 is configured for emitting/receiving light carrying optical signals. The photoelectric element 20 can be a laser diode, a photodiode, or a combination of a laser diode and a photodiode. The photoelectric element 20 includes a base portion 21 and an optical portion 22 formed on the base portion 21. The base portion 21 includes a bottom surface 211 and a top surface 212 opposite to the bottom surface 211. The photoelectric element 22 includes a first conductive pin 214 formed on the bottom surface 211. The optical portion 22 includes an optical surface 221, which serves as an emergent/incident surface of optical signals. The photoelectric element 20 is connected to the PCB 10 via a flip chip, the optical surface 221 faces toward the bottom surface 114 of the groove 113, and the first conductive pin 214 is connected to the first contacting portion 121. In this embodiment, the first connective pin 214 is connected to the first contacting portion 121 by a soldering ball 50. A material of the soldering ball 50 is gold.

The driver chip 30 is configured for driving the photoelectric element 20 to emit/receive light carrying optical signals. The driver chip 30 includes two second conductive pins 31 corresponding to the second contacting portion 122. The driver chip 30 is mechanically and electrically connected to the PCB 10, such that a surface having the second conductive pins 31 faces toward the PCB 10. In this embodiment, the driver chip 30 is connected to the PCB 10 via a flip chip. In detail, the second conductive pins 31 are respectively electrically connected to the corresponding second electrical contacting portions 122 by two corresponding soldering balls 60. The driver chip 30 and the photoelectric element 20 are electrically connected to each other by the circuit unit 12.

The light waveguide 40 is configured for transmitting optical signals. An end of the light waveguide 40 is positioned on the bottom surface 114 of the groove 113, and the end of the light waveguide 40 is spaced for a predetermined distance from the side surface 115 of the groove 113, as such, the end of the light waveguide 40 is out of a projection area of the optical portion 22 along a direction substantially perpendicular to the second surface 112. The light waveguide 40 includes a clamping member 41 for positioning the end of the light waveguide 50 on the PCB 10. The clamping member 41 includes an engaging block 411 corresponding to the engaging groove 1141, and the engaging block 411 is engaged into the engaging groove 1141.

The optical communication apparatus 100 further includes a pad 70 positioned between the photoelectric element 20 and the light waveguide 40. The pad 70 supports an end of the photoelectric element 20 on the light waveguide 40. The pad 70 is made from a heat insulation material, which can prevent heat generated from the photoelectric element 20 from conducting to the light waveguide 40.

In use, the photoelectric element 20 (i.e. laser diode) emits light carrying optical signals to the side surface 115 of the groove 113, the reflecting layer 1151 reflects the light for a predetermined angle to make the light incident into the light waveguide 40. The end of the light waveguide 40 is out of the projection area of the optical portion 22 along a direction substantially perpendicular to the second surface 112, so the light is prevented from directly entering into the light waveguide 40 until being reflected by the reflecting layer 1151. The reflecting layer 1151 has a high heat conductivity, so heat generated by the photoelectric element 20 can be efficiently dissipated by the reflecting layer 1151. Therefore, a deformation of the end of the light waveguide 40 because of heat generated by the photoelectric element 20 is avoided, and an optical transmitting efficiency of the optical communication apparatus 100 is ensured.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the disclosure.

What is claimed is:

1. An optical communication apparatus, comprising:
   a PCB defining a groove in a surface thereof, the groove comprising a bottom surface substantially parallel to the surface of the PCB and a side surface connected to the bottom surface, the PCB comprising a reflecting layer coated on the side surface;
   a photoelectric element positioned on the PCB, the photoelectric element comprising an optical portion;
   a driver chip positioned on the PCB for driving the photoelectric element, the driver chip and the photoelectric element being electrically connected to each other by the PCB; and
   a light waveguide, an end of the light waveguide being positioned on the bottom surface of the groove;
   wherein an optical signal emitting/receiving direction of the photoelectric element being substantially perpendicular to the surface of the PCB, the side surface passing through a projection area of the optical portion along a direction substantially perpendicular to the surface of the PCB and inclining relative to the optical signal emitting/receiving direction for a predetermined angle, the end of the light waveguide is out of the projection area of the optical portion, and the reflecting layer reflects light between the photoelectric element and the light waveguide, thereby coupling optical signals between the photoelectric element and the light waveguide.

2. The optical communication apparatus of claim 1, wherein the reflecting layer is made from a heat conductivity material.

3. The optical communication apparatus of claim 2, wherein the material of the reflecting layer is made from an alloy of nickel and gold.

4. The optical communication apparatus of claim 1, wherein the PCB comprises a substrate and a circuit unit formed on the substrate, the substrate comprises a first surface and an opposite second surface, the groove is defined in the second surface, the photoelectrical element and the driver chip are positioned on the second surface and electrically connected to each other by the circuit unit.

5. The optical communication apparatus of claim 4, wherein the circuit unit comprises a first contacting portion corresponding to the photoelectric element, two second contacting portions corresponding to the driver chip, and a connecting portion, the photoelectric element is electrically connected to the first contacting portion, the driver chip is electrically connected to the second contacting portions, two ends of the connecting portion are respectively connected to the first contacting portion and one of the second contacting portions.

6. The optical communication apparatus of claim 5, wherein the first contacting portion and the second contacting portions are positioned on the second surface, and the connecting portion is embedded in the substrate.

7. The optical communication apparatus of claim 1, wherein the light waveguide comprises a clamping member, the clamping member clamps the end of the light waveguide and fixes the end of the light waveguide on the bottom surface of the groove.

8. The optical communication apparatus of claim 7, wherein the clamping member comprises an engaging block, the PCB defines an engaging groove in the bottom surface of the groove, the engaging block is engaged into the engaging groove.

9. The optical communication apparatus of claim 1, wherein the optical communication apparatus comprises a pad positioned between the photoelectric element and the light waveguide, the pad supports an end of the photoelectric element on the light waveguide.

10. The optical communication apparatus of claim 1, wherein the pad is made from a heat insulation material.

\* \* \* \* \*